United States Patent
Tamaki et al.

(10) Patent No.: US 6,287,729 B1
(45) Date of Patent: Sep. 11, 2001

(54) GRAPHITE MATERIALS FOR NEGATIVE ELECTRODE USED IN LITHIUM SECONDARY BATTERY

(75) Inventors: Toshio Tamaki; Kazunori Ishigami, both of Ibaraki-ken (JP)

(73) Assignee: Petoca, Ltd., Tokyo (JP)

( * ) Notice: Subject to any disclaimer, the term of this patent is extended or adjusted under 35 U.S.C. 154(b) by 0 days.

(21) Appl. No.: 09/443,347

(22) Filed: Nov. 19, 1999

(30) Foreign Application Priority Data

Nov. 25, 1998 (JP) .................................................. 10-334384

(51) Int. Cl.⁷ ..................................................... H01M 4/24
(52) U.S. Cl. .................................. 429/231.8; 429/231.95
(58) Field of Search ............................. 429/231.95, 231.8

(56) References Cited

U.S. PATENT DOCUMENTS

| | | |
|---|---|---|
| 5,356,574 | 10/1994 | Tamaki et al. . |
| 5,698,341 | 12/1997 | Tamaki et al. . |
| 5,824,245 | 10/1998 | Tamaki et al. . |

FOREIGN PATENT DOCUMENTS 0 688 057   12/1995   (EP) .
0688057  *  12/1995   (EP) ................................ H01M/4/58

* cited by examiner

*Primary Examiner*—Gabrielle Brouillette
*Assistant Examiner*—M. Wills
(74) *Attorney, Agent, or Firm*—Oblon, Spivak, McClelland, Maier & Neustadt, P.C.

(57) ABSTRACT

There are disclosed graphite materials for a negative electrode used in a lithium secondary battery which graphite materials have an average specific surface area of 1.5 m²/gram to 5 m²/gram and comprise (A) milled graphite fibers which are produced by milling and graphitizing mesophase pitch-based carbon fibers, and which have an interplanar spacing of the graphite layer ($d_{002}$) of at most 0.337 nm and a specific surface area of 0.8 m²/gram to 1.3 m²/gram; and (B) graphite materials which have an interplanar spacing of the graphite layer ($d_{002}$) of at most 0.336 nm, a degree of graphitization ($P_{101}/P_{100}$) of at least 2.0 and a specific surface area of 2 m²/gram to 15 m²/gram, wherein the components (A) and (B) are mixed at a ratio (A)/(B) by weight of 90/10 to 50/50. The above graphite materials comprising the components (A) and (B), when used for a negative electrode in a lithium secondary battery, can enhance the performance of the battery and charge/discharge capacity thereof especially in a high load discharge.

5 Claims, No Drawings

GRAPHITE MATERIALS FOR NEGATIVE ELECTRODE USED IN LITHIUM SECONDARY BATTERY

BACKGROUND OF THE INVENTION

1. Field of the Invention

The present invention relates to graphite materials which are well suited to negative electrode materials for use in a lithium secondary battery, and which are capable of enhancing the performance of the battery. More particularly, the present invention pertains to graphite materials for a negative electrode used in a lithium secondary battery which materials are capable of enhancing the performance of the battery by a technique in which milled graphite fibers and specific graphite materials (natural graphite, artificial graphite or a mixture thereof) are mixed with each other at a an appropriate proportion so as to regulate the specific surface area of the mixture within a specific range.

2. Description of the Related Art

There has been widely investigated and put into practice the use of mesophase pitch-based milled graphite fibers as a negative electrode for a lithium secondary battery, as disclosed for example, in Japanese Patent Application Laid-Open Nos. 325967/1993 (Heisei-5), 36802/1994 (Heisei-6), and 90725/1995 (Heisei-7).

The mesophase pitch-based milled graphite fibers are excellent in that the fibers have high efficiency of initial charge and discharge, good load characteristics and further favorable adhesivity to electricity collectors. However, when compared with natural graphite and artificial graphite which have a high degree of graphitization, the aforesaid fibers are somewhat inferior with respect to initial capacity and low rate capability presumably because of their lower degree of graphitization. Accordingly, it is considered to be some room for their further improvement.

On the one hand, there has been investigated and put into practice in part, the use of natural graphite and artificial graphite which have a high degree of graphitization as negative electrode materials for a lithium secondary battery. Nevertheless, there is recognized the tendency that these graphite has low efficiency of initial charge and discharge, poor load characteristics, further unfavorable adhesivity to electricity collectors and the like as compared with the mesophase pitch-based milled graphite fibers.

In addition, for the purpose of complementing the items to be improved in a single kind of material, researches have been made on the mixed use of various materials.

In regard to the mixing system, the scope of researches covers wide fields including a variety of combinations of the materials to be mixed, such as graphite base/graphite base, carbon base/carbon base, graphite base/carbon base, graphite base/carbon base that are incorporated with an electroconductive material and a mixed system of at least three kinds of materials.

With respect to the mixing of graphite base/graphite base, for example, there is disclosed that improvements are recognized in the capacity and cycle characteristics on the discharge per hour by the mixing of spheroidal graphitized carbon particles and 5 to 30% by weight of graphitized carbon short fiber in Japanese Patent Application Laid-Open No.111818/1994 (Hesei-6).

There are also disclosed for the same purpose, the mixing of graphite materials comprising spheroidal particles (MCMB) and not more than 20% by weight of graphite fine particles (natural graphite, artificial graphite or the like) having a particle diameter smaller than that of MCMB in Japanese Patent Application Laid-Open No. 37618/1995 (Heisei-7); the mixing of graphite materials comprising spheroidal particles (MCMB) or the like and 5 to 20% by weight of fibrous graphite in Japanese Patent Application Laid-Open No. 287952/1996 (Heisei-8).

There are also disclosed for the same purpose, the mixing of mesophase pitch-based milled carbon fibers and 5 to 20% by weight of natural or artificial graphite in Japanese Patent Application Laid-Open No. 83608/1996 (Heisei-8); and the mixing of graphite material and graphite material different in bulk density from each other in Japanese Patent Application Laid-Open No. 180873/1996 (Heisei-8).

SUMMARY OF THE INVENTION

On the basis of the understanding of the prior arts as described hereinbefore, a general object of the present invention is to provide graphite materials for a negative electrode used in a lithium secondary battery which materials make use of mesophase pitch-based milled graphite fibers, and are capable of enhancing the performances such as the capacity of the battery, the efficiency of charge and discharge, low rate characteristics and adhesivity to electricity collectors.

Other objects of the present invention will be obvious from the text of the specification hereinafter disclosed.

In the light of the above-mentioned object, research and investigation were made by the present inventors on the mixing of mesophase pitch-based milled graphite fibers as the base with a variety of graphite materials, paying attention to the mixing of graphite materials/graphite materials. As a result, it has been found that excellent performances as a negative electrode for a lithium secondary battery are manifested through the use of a mixed graphite materials that are formed by mixing mesophase pitch-based milled graphite fibers which have specific properties with natural graphite or artificial graphite which has specific properties and a high degree of graphitization within a specific proportion so as to regulate the specific surface area of the resultant mixture within a specific range. The present invention has been accomplished on the basis of the above-mentioned findings and information.

That is to say, the present invention provides graphite materials for a negative electrode used in a lithium secondary battery which graphite materials have an average specific surface area in the range of 1.5 m$^2$/gram to 5 m$^2$/gram and comprise (A) milled graphite fibers which are produced by milling and graphitizing mesophase pitch-based carbon fibers, and which have an interplanar spacing of the graphite layer $d_{002}$ of at most 0.337 nm and a specific surface area in the range of 0.8 m$^2$/gram to 1.3 m$^2$/gram; and (B) graphite materials which have an interplanar spacing of the graphite layer $d_{002}$ of at most 0.336 nm, a degree of graphitization $(P_{101}/P_{100})$ of at least 2.0 and a specific surface area in the range of 2 m$^2$/gram to 15 m$^2$/gram so that the ratio (A)/(B) by weight is set in the range of 90/10 to 50/50.

In what follows, the present invention will be described in more detail.

DESCRIPTION OF THE PREFERRED EMBODIMENTS

[I] Preparation and Properties of Mesophase Pitch-Based Milled Graphite Fibers

In the following, some description will be given of the preparation process for mesophase pitch-based milled graphite fibers that are well suited for the present invention.
<Outline of Preparation Process>

The mesophase pitch-based milled carbon fibers according to the present invention are produced usually in accordance with a conventional process, by spinning a mesophase pitch as a starting material, infusibilizing the resultant spun fibers, carbonizing the resultant infusibilized fibers at a relatively low temperature to form carbon fibers, thereafter milling the resultant carbon fibers, regulating the milled fibers to proper particle sizes, and then subjecting said fibers to graphitizing treatment at a relatively high temperature.

In the following, detailed description will be given of each of the production steps.
<Pitch as the Starting Material>

A pitch as the starting raw material according to the present invention is not specifically limited, provided that it is spinnable, and it is exemplified by a petroleum base, coal base and synthesis base. In particular, there is used an easily graphitizable pitch, preferably a mesophase pitch having a mesophase content of 100%.

The softening point of a pitch as the starting material is not specifically limited. It is advantageous, however, to employ a pitch having a low softening point from the aspect of spinning temperature, and also a pitch having a high infusibilization reaction rate from the viewpoint of production cost and the stability of product quality. Accordingly, the softening point of a pitch as the starting material is usually in the range of 230° C. to 350° C., preferably 250° C. to 310° C.
<Spinning>

The method for melt-spinning the pitch as the starting material is not specifically limited, and can be exemplified by a variety of methods such as melt spinning, melt blow spinning and centrifugal spinning, of which is preferable melt blow spinning method from the standpoints of productivity at the time of spinning and the quality of the fibers thus obtained.

In order to enhance the battery performance, it is desirable that the faces of graphite layers are disposed so as to have openings on the surfaces of the fibers. The melt blow spinning method using mesophase pitch is particularly preferable in that it is capable of causing the faces of graphite layers to have openings on the surfaces of the fibers through the spinning at a low viscosity of not more than several tens poise and cooling at a high rate.

The size of a spinning orifice at the time of melt blow spinning is in the range of 0.1 mm to 0.5 mm in diameter, preferably 0.15 mm to 0.3 mm in diameter.

The spinning rate at the time of melt blow spinning is at least 500 m per minute, preferably at least 1500 m per minute, more preferably at least 2000 m per minute. The cooling rate is at least $1 \times 10^{4}$° C./sec, preferably at least $1 \times 10^{5}$° C./sec.

The spinning temperature is varied to some extent depending upon the pitch as the starting material, and needs to be not lower than the softening point of the pitch as the starting material, and also needs to be a temperature at which the pitch is not deteriorated. Hence, the spinning temperature is in the range of 300 to 400° C., preferably 300 to 380° C.

The spun fibers that have been spun under the foregoing conditions are preferable in that the fibers are apt to assume the form of tiles partially overlapped in order whose surface layer is considered to be well suited for entering and leaving of lithium ions owing to the subsequent carbonization and graphitization.
<Infusibilization>

The method for infusibilization is not specifically limited, but can be exemplified by a method in which the spun fiber is heat treated by a conventional method in an atmosphere of an oxidizing gas such as nitrogen dioxide and oxygen, a method in which the spun fiber is treated in an oxidizing aqueous solution of nitric acid, chromic acid or the like and a polymerizing treatment method using light, γ-ray or the like. More simple and convenient method is a method in which the spun fiber is heat treated in air at 200 to 350° C. for a definite period of time at an average tempera-ture raising rate of at least 3° C./min, preferably at least 5° C./min.

The degree of graphitization after the carbonization tends to be increased with decrease in infusibilization yield (the ratio by the weight of fibers after/before infusibilization, said yield being controlled by highest infusibilization temperature and temperature raising rate), and accordingly the infusibilization yield is preferably lower from the viewpoint of battery capacity.

However, the lower the infusibilization yield, the higher the possibility of fused adhesion of the fibers and also of fouling of a carbonization furnace due to the increased generation of volatile matters at the time of carbonization. It is therefore preferable to select an appropriate infusibilization yield taking fiber diameter into consideration.

In this connection, the preferable infusibilization yield ranges from 104 to 106% for a fiber diameter of about 15 μm before infusibilization, and ranges from 105 to 107% for a fiber diameter of about 18 μm before infusibilization.
<Carbonization>

The infusibilized fibers can be made into carbon fibers by a conventional method by a heat treatment (carbonization) in the absence of an oxidizing gas, for instance, in an inert gas. There is no specific limitation at the time of the heat treatment to a temperature raising rate or a preservation time at a specific temperature. The carbonization temperature is in the range of preferably 500 to 1300° C., more preferably 600 to 900° C.

Since the crystalline structure of carbon fibers and the physical properties thereof such as hardness vary greatly depending upon the heat treatment temperature (carbonization and graphitization), the heat treatment temperature for fibers before milling exerts a great influence on the properties of fibers after milling.

It is necessary therefore to prescribe the carbonization temperature for the purpose of suppressing the formation of agglomerated and stuck particles in the case of the carbon fibers being used for a negative electrode for a lithium secondary battery.

In the case where the carbonization temperature is lower than 500° C., the carbon fibers are more prone to be pulverized to the extent that the configuration thereof can not be maintained (that is, the ratio of fine powders also increases) because of an unreasonably low hardness of the carbon fibers, thus bringing about unfavorable result as described hereunder.

In the case where the carbonization temperature is higher than 1300° C., the carbon fibers are rapidly made so hard that the machinery and equipment are liable to abrasion and damage at the time of milling, thereby unfavorably increasing to a great extent, metallic components which become the nucleus of the agglomerated and stuck particles.

The carbonization temperature exceeding 1300° C. is unfavorable also from the disadvantage that the carbon fibers are subjected to longitudinal crack at the time of milling, and an active graphite layer is exposed and reacted with an electrolyte, thereby lowering the capacity and the efficiency of charge and discharge.

<Milling (Pulverization)>

In the present invention, the carbon fibers which have been carbonized in the above-mentioned temperature range are subjected to milling treatment. In order to facilitate the entering and leaving of lithium ions, it is required to decrease the length of the fibers, that is, to increase the surface area of fibers per unit volume (unit weight) of the fibers.

However, excessively fine fiber particles bring about such disadvantages as deterioration in battery capacity, charge and discharge efficiency and the like, since an active graphite layer is exposed and is reacted with an electrolyte. It is therefore, needed to maintain the particle size distribution and the average particle diameter each at a moderate level.

In addition, it is a major factor of enhancing the battery performance to increase the surface area of the fibers, while maintaining the original configuration of the fibers.

By maintaining the original configuration of the fibers, the graphite layer faces form openings all over the fiber surfaces and the cross section, thereby facilitating the entering and leaving of lithium ions. In particular, as mentioned before, the graphite layer faces having openings in the form of tiles partially overlapped in order on the surfaces of the fibers exhibit favorable cycle characteristics.

In view of the foregoing, the average particle diameter of the milled carbon fibers is in the range of 8 to 50 $\mu$m, preferably 12 to 30 $\mu$m, and the aspect ratio (ratio of fiber length to fiber diameter) is in the range of 1 to 10, preferably 1.2 to 6.

Further, the milled carbon fibers having an aspect ratio of less than 1 are unfavorable, since said fibers are unreasonably pulverized, thus bringing about difficulty in maintaining the original configuration of the fibers, and the lowering of the battery capacity, whereas the fibers having a length of 120 $\mu$m or more (aspect ratio of 13 or more for a fiber diameter of 9 $\mu$m) are also unfavorable, since said fibers are factors of causing short circuit of the battery.

For the reasons described before, it is desirable to restrict the content of the fibers having an aspect ratio of less than 1 on at most 3%, preferably at most 2% by weight, and also to restrict the content of the fibers having a fiber length of 120 $\mu$m or more on at most 5%, preferably at most 3% by weight.

The fiber particle diameter was that measured with a laser diffraction-type particle size measuring apparatus. The average aspect ratio of the fibers are shown by the average value obtained from arbitrarily sampled 100 pieces of fibers after milling.

Examples of machines and equipment that are usable in the milling step according to the present invention include ball mills, grinding mashing mills, victory mills, jet mills, turbo mills and rotary mills. Of these, are most preferable in particular, high rotational speed mills in which a rotor equipped with blades is rotated at a high speed, for instance, high rotational speed mills. In this case, the milled carbon fibers can be controlled in its fiber length by regulating the number of revolutions of the rotor, the angle of the blades, the size of openings of a filter installed on the periphery of the rotor and the like. Consideration may be given to carrying out milling of the fibers after graphitization treatment, but it is unfavorable because of excessively hardened fibers as mentioned hereinbefore.

<Graphitization>

The resultant milled carbon fibers are then fired at a high temperature, for instance, in a batchwise graphitization furnace so that the fibers are made into milled graphite fibers. The graphitization treatment is put into practice usually at a temperature of 2000° C. or higher. In order to further enhance the battery capacity, in the case of pitch-based carbon fibers as used in the present invention, it is required to further enhance the degree of graphitization. Accordingly, it is preferable in this case, to carry out the graphitization at a temperature of 2600° C. or higher, more preferably 2800° C. or higher.

For the purpose of efficiently carrying out the graphitization treatment, it is usually favorable to increase the packing amount of carbon fibers per unit volume. Accordingly it is advantageous as is the case with the present invention, to carry out the graphitization treatment after the milling treatment also from the aspect of curtailing the cost.

Although the graphitization temperature is preferably higher from the aspect of battery capacity and the like, the manufacturing cost of the graphitized carbon fibers sharply increases with a rise of graphitization temperature. Moreover, when the graphitization temperature exceeds 3000° C., it is made difficult to steadily manufacture the graphitized carbon fibers in a commercial scale by reason of the durability of the furnace materials to be used for graphitization. It is necessary therefore, to properly select the graphitization temperature.

With the object of further enhancing the degree of graphitization, there is usable a graphitization method in which a boron compound or the like is added to the carbon fibers and which is expected to enable the graphitization temperature to be lowered.

It is made possible in the present invention to prevent longitudinal crack of the carbon fibers after milling by the above-mentioned procedure in which the fibers are carbonized within a specific temperature range, and the resultant carbon fibers are milled, followed by the graphitization treatment. It is also effective in the present invention in that even if new graphite layer faces are exposed on the surfaces at the time of milling, polycondensation and cyclization reaction proceed at the time of graphitization treatment at a higher temperature, and thus the surface activity is lowered, thereby inhibiting the decomposition of an electrolyte.

<Properties of Mesophase Pitch-Based Milled Graphite Fibers>

The mesophase pitch-based milled graphite fibers produced in the foregoing manner are imparted with the properties as described hereunder, and are well suited as a material for a negative electrode used in a lithium secondary battery.

(a) interplanar spacing of the graphite layer ($d_{002}$): 0.3354 to 0.3370 nm
(b) degree of graphitization ($P_{101}/P_{100}$): 1.2 to 2.0
(c) Lc: at least 30 nm
(d) specific surface area: 0.8 to 1.3 m²/gram The above-mentioned properties are obtained by the following measuring methods.

<Interplanar Spacing of the Graphite Layer ($d_{002}$), Lc, Degree of Graphitization ($P_{101}/P_{100}$)>

These properties are determined by X-ray diffraction method which measures diffraction patterns using CuKα-ray as X-ray source and highly pure silicon as the standard reference material on the basis of the method of the Japan Society for Promotion of Scientific Research.

(a) interplanar spacing of the graphite layer ($d_{002}$) and the size of crystallites in the direction of C-axis {$Lc_{(002)}$} are each calculated from the peak position and half-value width of (002) diffraction pattern.
(b) degree of graphitization ($P_{101}/P_{100}$), which is represented by the ratio of (101) diffraction peak in X-ray diffraction to (100) diffraction peak in the same, is obtained by drawing a base line on the resultant X-ray diagram, measuring the peak height of each of (101) and (100) from the base line, and dividing the height of (101) diffraction peak by the height of (100) diffraction peak. The degree of graphitization is used as the index which indicates the extent of graphitization of a carbon material, and increases as the degree of graphitization enhances.

<Specific Surface Area>

The specific surface area is determined by BET method using nitrogen adsorption, and is represented by the value having two-digits of significant figures, while taking into consideration the accuracy and precision of the measurement.

[II] Graphite Materials to be Mixed and Mixing Ratio

① As the results of various investigations made by the present inventors, the graphite materials to be mixed with mesophase pitch-based milled graphite fibers are required to be natural graphite or artificial graphite in itself each having an excellent discharge capacity of a battery as well as high degree of graphitization, and at the same time to have the following shape and properties from the viewpoint of compatibility with the mesophase pitch-based milled graphite fibers according to the present invention. Further, the scope of the graphite materials to be mixed in the present invention include not only one type of graphite material having the following properties, but also mixed graphite materials which are formed by mixing at least two types of graphite materials, and which are made to have the following properties.

(a) Shape: flaky, granular

Graphite materials in flaky or granular shape are preferable in that said materials play the role in filling the clearance among the fibers in the case of mixing with fibrous milled graphite fibers, thus increasing the packing density of an electrode. In particular, flaky shape is more preferable in that a high packing density of at least 1.4 g/cm³ is obtained by orientation with a press at the time of producing an electrode.

(b) interplanar spacing of the graphite layer ($d_{002}$): 0.3345 to 0.3360 nm
(c) degree of graphitization ($P_{101}/P_{100}$): 2.0 to 3.6

A high degree of graphitization is preferable because of resultant high initial-battery-capacity.

(d) specific surface area: 2 to 15 m²/gram, preferably 3 to 15 m²/gram, more preferably 3.2 to 10 m²/gram The specific surface area is concerned with penetration properties with an electrolyte and entering/leaving of lithium ions. A specific surface area, when being too large, involves a fear of causing decomposition of the electrolyte, whereas when being too small, lowers the initial-battery-capacity and causes unfavorable results concerning the particle size as described hereunder.

The particle sizes of the graphite materials are restricted by the packing density of the graphite materials after mixing with the graphite fibers as well as the specific surface area of the graphite materials, and in the present invention, are generally in the range of 3 to 50 μm, preferably 5 to 30 μm expressed in terms of average particle size.

② The mixing ratio by weight of the mesophase pitch based milled graphite fibers (A) to the graphite materials (B) [(A)/(B)] is in the range of 90/10 to 50/50, preferably 80/20 to 60/40, more preferably 75/25 to 60/40, and the specific surface area in average after mixing is in the range of 1.5 to 5 m²/gram, preferably 1.7 to 3.8 m²/gram.

The electrode produced by mixing the graphite materials within the aforesaid range has excellent impregnating properties with an electrolyte, a high packing density and enhanced electroconductivity, thereby leading to the enhancement of battery performances. An electrode produced by mixing the graphite materials at any ratio outside the aforesaid range of the present invention is unfavorable, since the working effect due to mixing upon battery performances is hardly recognized.

In particular, a specific surface area exceeding 5 m²/gram is unfavorable, since the electrolyte becomes liable to be decomposed, the efficiency of initial charge and discharge is lowered, the viscosity of solution is unreasonably increased, and a large amount of solvent is needed at the time of coating, thereby unfavorably increasing the manufacturing cost and prolonging the time of drying step.

[III] Mixing Method

It is preferable to mix the mesophase pitch-based milled graphite fibers and the graphite materials so as to prevent an adverse influence from exerting upon the physical properties of any of said fibers and materials, and sufficiently uniformize the physical properties after the mixing.

There are available a rotational vessel type mixer, a ribbon blender and the like mixer as a mixer for agitating the powders and/or granules. A fixed vessel type mixer equipped with a planetarily motional screw is exemplified as a mixer capable of efficiently uniformizing, within a relatively short period of time, the graphite materials having such a particle size as is the case with the present invention without destroying individual graphite materials.

This mixer, which is of inverse circular cone type, is particularly preferable in that it can efficiently agitate the materials in a comparatively mild manner without imparting unnecessary impact to the graphite materials, since a rotating rod equipped with spiral screws is allowed to revolve along the walls of the vessel of the mixer, while allowing the screw to rotate.

It is preferable to set the agitation conditions such as mixing hours so as to suppress the influence of the variation in the physical properties of samples at an arbitrary position upon the performance of a battery by the use of the degree of graphitization as a control target.

In the case of the fixed vessel type mixer equipped with a planetarily motional screw, the purpose of uniformization is sufficiently achieved during an agitation hour of 5 to 60 minutes, preferably 10 to 30 minutes.

[IV] Constitution of Negative Electrode:

The mixture according to the present invention which comprises the mesophase pitch-based milled graphite fibers and the specific graphite materials, can be made into a negative electrode by a conventional method as is the case with each of the components without mixing.

That is to say, there is widely used a method which comprises the steps of adding a binder such as polyethylene or polyvinylidene fluoride to the starting material; making the resultant mixture into the form of slurry by the use of an organic solvent or water as the solvent; applying the slurry thus obtained to either or both sides of a metallic foil composed of copper, nickel or the like having a thickness of 10 to 50 $\mu$m; rolling the coated foil thus obtained; and drying the same into a sheet product having a thickness of about 100 $\mu$m. Thereafter the sheet product is usually slitted into a prescribed width and length, and the resultant slitted pieces are made into the form of can by winding together with a positive electrode and a separator.

② Battery:
(a) In the case of preparing a lithium secondary battery by the use of the mixture according to the present invention which comprises the mesophase pitch-based milled graphite fibers and the specific graphite materials, the electrolytic solution used therein needs to be capable of dissolving a lithium salt, and is preferably an aprotic organic solvent having a high dielectric constant.
(b) Examples of the above-mentioned organic solvent include propylene carbonate, ethylene carbonate, tetrahydrofuran, 2-methyltetrahydrofuran, dioxolan, 4-methyl-dioxolan, acetonitrile, dimethyl carbonate, methylethyl carbonate and diethyl carbonate. Any of these solvents may be used alone or by mixing with at least one other.
(c) A preferable example of the electrolyte is a lithium salt which forms a stable anion, said salt being exemplified by lithium perchlorate, lithium borofluoride, lithium hexachloroantimonate and lithium hexafluoroantimonate.
(d) Examples of positive electrodes that are usable in a lithium secondary battery include a metal oxide such as a chromium oxide, a titanium oxide, a cobalt oxide and vanadium pentaoxide; a lithium metal oxide such as lithium-manganese oxide ($LiMn_2O_4$), lithium-cobalt oxide ($LiCoO_2$) and lithium-nickel oxide ($LiNiO_2$); a chalcogen compound of a transition metal such as titanium sulfide and molybdenum sulfide; and a conjugate high-molecular substance having electroconductivity such as polyacetylene, poly-p-phenylene and polypyrrole.
(e) There is interposed, between a positive electrode and a negative electrode that are opposed to each other, a separator comprising nonwoven fabric or woven fabric each made of synthetic fiber or glass fiber, a polyolefin-based porous film, nonwoven fabric made of polytetrafluoroethylene or the like material.

The above-mentioned lithium secondary battery in the form of cylinder, square, button or the like can be fabricated according to a conventional method by the use of the specific negative electrodes in connection with the present invention, positive electrodes and other battery constituents such as the separator as mentioned above, electricity collectors, gaskets, sealing plates and a battery case.

As detailed hereinbefore, the graphite materials according to the present invention, when used for a negative electrode in a lithium secondary battery, can enhance the performance of the battery and charge/discharge capacity thereof especially in a high load discharge, by virtue of the specific constitution which comprises the above-described mesophase pitch-based milled graphite fibers and the specific graphite materials.

In the following, the present invention will be described in more detail with reference to comparative examples and working examples, which however shall not limit the present invention thereto.

EXAMPLE 1 AND COMPARATIVE EXAMPLE 1

<Preparation of Mesophase Pitch-Based Milled Graphite Fibers>

Pitch fibers were prepared by the use of optically anisotropic petroleum-base mesophase pitch having a softening point of 280° C. as the starting material by a melt blow spinning method wherein molten pitch was dragged through a spinneret which had 1500 numbers of spinning holes with a diameter of 0.2 mm and arranged in a row in a slit with a width of 3 mm, while heated air was blown out through the slit. At that time, the pitch had a viscosity of 12 poise. The spun pitch fibers thus obtained were collected in the form of mat on a stainless steel-made wire mesh belt having 20 mesh number on the collecting portion, while sucking from the rear side of the belt. Subsequently the collected mat was heated in the air to raise the temperature thereof from room temperature to 300° C. at an average temperature raising rate of 6° C. per minute to proceed with infusibilization treatment.

The infusibilized mesophase pitch fibers thus obtained were subjected to carbonization treatment at 650° C. to produce carbon fibers. Subsequently, the resultant carbon fibers were milled with a high-speed rotation type mill to produce milled carbon fibers.

Thereafter, said milled carbon fibers were heat treated at 3000° C. by means of a direct current-passing type electric furnace to produce milled graphite fibers. The properties of the resultant milled graphite fibers included a true density of 2.24 g/cm³, $d_{002}$ of 0.3366 nm, Lc of 45 nm, specific surface area of 1.0 m²/gram, degree of graphitization of 1.21, average fiber diameter of 9 $\mu$m, average particle diameter of 17.5 $\mu$m, average aspect ratio of 2.1, a ratio of milled graphite fibers having an average aspect ratio of 1 or less being 1.7% by weight, and a ratio of milled graphite fibers having a fiber length of 120 $\mu$m or longer being 2.1% by weight.

<Graphite Materials for Use in Mixing>

There was prepared flaky artificial graphite having the structural characteristics including a true density of 2.25 g/cm$^3$, $d_{002}$ of 0.3354 nm, specific surface area of 8.0 m$^2$/gram, degree of graphitization of 3.0, and average particle diameter of 8.8 μm.

Thereafter there were prepared 6 kinds of mixed graphite materials each having the structural characteristics as shown in Tables 1&2 by mixing 10 to 60% by weight of the artificial graphite as shown in Tables 1&2 in the pitch-based milled graphite fibers thus obtained, and then agitating the mixture thus obtained for 15 minutes with a fixed vessel type mixer equipped with planetarily motional screws.

Subsequently in order to carry out charge and discharge tests with a three pole battery, copper foils each having a thickness of 18 μm were coated with the coating solutions which had been prepared by adding polyvinylidene fluoride in an amount of 7% by weight to each of the pitch-based milled graphite fibers, the artificial graphite materials and the mixed graphite materials, and adjusting the viscosity of the coating solutions with N-methyl-pyrrolidone.

The characteristics for charge and discharge capacities of each of the graphite materials as the negative electrode were measured 10 times each repeatedly by the use of metallic lithium as the positive electrode also as the reference electrode in the electrolytic solution having one molar concentration of lithium perchlorate (LiClO$_4$) as the electrolyte in a mixed solvent of carbonic acid ester of ethylene carbonate (EC)/dimethyl carbonate (DMC) at a ratio by volume of 1:1 under charging or discharging at a constant current of 1, 2, 4 and 6 mA/cm$^2$, respectively for the measurement of load characteristics within the range of measured potential of 0 to 2V (vs Li/Li$^+$.)

The results of measurements are given in Tables 1&2.

TABLE 1

|  | Example 1 | | Comp. Example 1 | |
| --- | --- | --- | --- | --- |
|  | Mixed graphite material 1 | Mixed graphite material 2 | Milled graphite fiber | Artificial graphite |
| Mixing Ratio | | | | |
| Milled graphite fiber | 80 | 70 | 100 | 0 |
| Artificial graphite | 20 | 30 | 0 | 100 |
| Properties | | | | |
| Specific Surface area (m$^2$/g) | 1.78 | 3.1 | 1.0 | 8.0 |
| True density (g/cm$^3$) | 2.24 | 2.24 | 2.24 | 2.25 |
| Average particle diameter (μm) | 15.8 | 14.9 | 17.5 | 8.8 |
| $d_{002}$ (nm) | 0.3364 | 0.3362 | 0.3366 | 0.3354 |
| $P_{101}/P_{100}$ | 1.56 | 1.75 | 1.21 | 3.0 |
| Negative Electrode Characteristics | | | | |
| Charge discharge efficiency (%) | 93 | 93 | 98 | 88 |
| Discharge capacity (mAh/g) at discharge of | | | | |
| 1mA/cm$^2$ | 321 | 327 | 310 | 365 |
| 2mA/cm$^2$ | 320 | 326 | 300 | 320 |
| 4mA/cm$^2$ | 310 | 320 | 280 | 300 |
| 6mA/cm$^2$ | 300 | 310 | 250 | 240 |

TABLE 2

|  | Example 1 | | Comp. Example 1 | |
| --- | --- | --- | --- | --- |
|  | Mixed graphite material 3 | Mixed graphite material 4 | Mixed graphite material 5 | Mixed graphite material 6 |
| Mixing Ratio | | | | |
| Milled graphite fiber | 60 | 50 | 90 | 40 |
| Artificial graphite | 40 | 50 | 10 | 60 |
| Properties | | | | |
| Specific Surface area (m$^2$/g) | 3.88 | 4.5 | 1.39 | 5.2 |
| True density (g/cm$^3$) | 2.24 | 2.25 | 2.24 | 2.25 |
| Average particle diameter (μm) | 14.0 | 13.2 | 16.6 | 12.3 |
| $d_{002}$ (nm) | 0.3361 | 0.3360 | 0.3364 | 0.3359 |
| $P_{101}/P_{100}$ | 1.93 | 2.10 | 1.39 | 2.28 |
| Negative Electrode Characteristics | | | | |
| Charge discharge efficiency (%) | 92 | 92 | 93 | 90 |
| Discharge capacity (mAh/g) at discharge of | | | | |
| 1mA/cm$^2$ | 332 | 340 | 315 | 343 |
| 2mA/cm$^2$ | 330 | 338 | 305 | 335 |
| 4mA/cm$^2$ | 325 | 332 | 290 | 300 |
| 6mA/cm$^2$ | 320 | 310 | 280 | 280 |

EXAMPLE 2

The procedure in Example 1 was repeated to determine the battery performance except that use was made of the artificial graphite and natural graphite each having the structural characteristics as shown in Table 3 at the proportions as shown in Table 3 in place of those in Example 1. In Table 3 are given the properties of the graphite materials after mixing along with the battery performance thus determined.

TABLE 3

|  | Example 1 | | Reference Example 1 | |
| --- | --- | --- | --- | --- |
|  | Mixed graphite material 7 | Mixed graphite material 8 | Artificial graphite | Natural graphite |
| Mixing Ratio | | | | |
| Milled graphite fiber | 70 | 70 | 0 | 0 |
| Artificial graphite | 30 | 0 | 100 | 0 |
| Natural graphite | 0 | 30 | 0 | 100 |
| Properties | | | | |
| Specific Surface area (m$^2$/g) | 2.17 | 1.69 | 4.9 | 3.3 |
| True density (g/cm$^3$) | 2.24 | 2.24 | 2.25 | 2.27 |
| Average particle diameter (μm) | 20.0 | 19.4 | 25.8 | 23.7 |
| $d_{002}$ (nm) | 0.3361 | 0.3361 | 0.3354 | 0.3354 |
| $P_{101}/P_{100}$ | 1.77 | 1.89 | 3.0 | 3.5 |
| Negative Electrode | | | | |

TABLE 3-continued

|  | Example 1 | | Reference Example 1 | |
|---|---|---|---|---|
|  | Mixed graphite material 7 | Mixed graphite material 8 | Artificial graphite | Natural graphite |
| Characteristics |  |  |  |  |
| Charge discharge efficiency (%) | 93 | 93 | 90 | 92 |
| Discharge capacity (mAh/g) at discharge of |  |  |  |  |
| 1mA/cm$^2$ | 328 | 330 | 365 | 370 |
| 2mA/cm$^2$ | 327 | 328 | 310 | 300 |
| 4mA/cm$^2$ | 325 | 324 | 220 | 220 |
| 6mA/cm$^2$ | 312 | 313 | 190 | 180 |

COMPARATIVE EXAMPLE 2

The procedure in Example 1 was repeated to determine the battery performance except that use was made of the artificial graphite having a large specific surface area as shown in Table 4 at the proportions as shown in Table 4 in place of those in Example 1. In Table 4 are given the properties of the graphite materials after mixing along with the battery performance thus determined.

TABLE 4

|  | Comparative Example 2 | | Reference Example 2 Artificial graphite |
|---|---|---|---|
|  | Mixed graphite material 9 | Mixed graphite material 10 |  |
| Mixing Ratio |  |  |  |
| Milled graphite fiber | 60 | 90 | 0 |
| Artificial graphite | 40 | 10 | 100 |
| Properties |  |  |  |
| Specific Surface area (m$^2$/g) | 7.0 | 2.5 | 16.0 |
| True density (g/cm$^3$) | 2.24 | 2.24 | 2.25 |
| Average particle diameter ($\mu$m) | 11.9 | 16.1 | 3.7 |
| d$_{002}$ (nm) | 0.3362 | 0.3364 | 0.3354 |
| P$_{101}$/P$_{100}$ | 1.90 | 1.39 | 3.0 |
| Negative Electrode Characteristics |  |  |  |
| Charge discharge efficiency (%) | 90 | 92 | 86 |
| Discharge capacity (mAh/g) at discharge of |  |  |  |
| 1mA/cm$^2$ | 325 | 315 | 348 |
| 2mA/cm$^2$ | 310 | 304 | 300 |
| 4mA/cm$^2$ | 250 | 290 | 200 |
| 6mA/cm$^2$ | 200 | 278 | 180 |

COMPARATIVE EXAMPLE 3

The procedure in Example 1 was repeated to determine the battery performance except that use was made of spheroidal MCMB (mesocarbon microbeads) as shown in Table 4 each having a degree of graphitization lower than that in Example 1 at the proportions as shown in Table 4 in place of those in Example 1. In Table 5 are given the properties of the graphite materials after mixing along with the battery performance thus determined.

TABLE 5

|  | Comparative Example 3 | | Reference Example 3 MCMB |
|---|---|---|---|
|  | Mixed graphite material 11 | Mixed graphite material 12 |  |
| Mixing Ratio |  |  |  |
| Milled graphite fiber | 70 | 90 | 0 |
| Artificial graphite | 30 | 10 | 100 |
| Properties |  |  |  |
| Specific Surface area (m$^2$/g) | 1.6 | 1.2 | 3.0 |
| True density (g/cm$^3$) | 2.24 | 2.24 | 2.24 |
| Average particle diameter ($\mu$m) | 16.8 | 17.3 | 15.0 |
| d$_{002}$ (nm) | 0.3365 | 0.3365 | 0.3364 |
| P$_{101}$/P$_{100}$ | 1.42 | 1.28 | 1.9 |
| Negative Electrode Characteristics |  |  |  |
| Charge discharge efficiency (%) | 91 | 92 | 90 |
| Discharge capacity (mAh/g) at discharge of |  |  |  |
| 1mA/cm$^2$ | 312 | 311 | 315 |
| 2mA/cm$^2$ | 290 | 285 | 280 |
| 4mA/cm$^2$ | 220 | 200 | 200 |
| 6mA/cm$^2$ | 180 | 170 | 150 |

What is claimed is:

1. Graphite materials for a negative electrode used in a lithium secondary battery which graphite materials have an average specific surface area in the range of 1.5 m$^2$/gram to 5 m$^2$/gram and comprise (A) milled graphite fibers which are produced by milling and graphitizing mesophase pitch-based carbon fibers, and which have an interplanar spacing of the graphite layer (d$_{002}$) of at most 0.337 nm and a specific surface area in the range of 0.8 m$^2$/gram to 1.3 m$^2$/gram; and (B) graphite materials which have an interplanar spacing of the graphite layer (d$_{002}$) of at most 0.336 nm, a degree of graphitization (P$_{101}$/P$_{100}$) of at least 2.0 and a specific surface area in the range of 2 m$^2$/gram to 15 m$^2$/gram, wherein the components (A) and (B) are mixed at a ratio (A) (B) by weight within the range of 90/10 to 50/50.

2. The graphite materials for a negative electrode used in a lithium secondary battery according to claim 1, wherein said graphite materials have an average specific surface area in the range of 1.7 m$^2$/gram to 3.8 m$^2$/gram.

3. The graphite materials for a negative electrode used in a lithium secondary battery according to claim 1, wherein the components (A) and (B) are mixed at a ratio (A)/(B) by weight within the range of 80/20 to 60/40.

4. The graphite materials for a negative electrode used in a lithium secondary battery according to claim 1, wherein the milled graphite fibers (A) have an interplanar spacing of the graphite layer ($d_{002}$) in the range of 0.3354 nm to 0.3370 nm, a degree of graphitization ($P_{101}/P_{100}$) in the range of 1.2 to 2.0, and a size of crystallites in the direction of C-axis(Lc) of at least 30 nm.

5. The graphite materials for a negative electrode used in a lithium secondary battery according to claim 1, wherein the graphite materials (B) have an interplanar spacing of the graphite layer ($d_{002}$) in the range of 0.3345 nm to 0.336 nm, a degree of graphitization ($P_{101}/P_{100}$) in the range of 2.0 to 3.6, and a specific surface area in the range of 3 $m^2$/gram to 15 $m^2$/gram.

* * * * *